May 3, 1955   F. H. HARDIE ET AL   2,707,755
HIGH ABSORPTION BACKINGS FOR ULTRASONIC CRYSTALS
Filed July 20, 1950
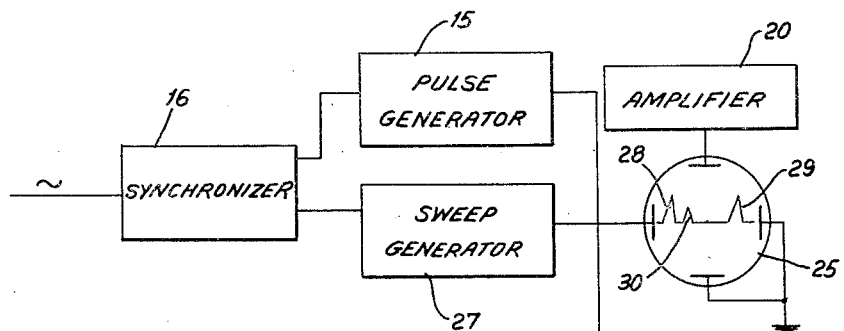
FIG. 1
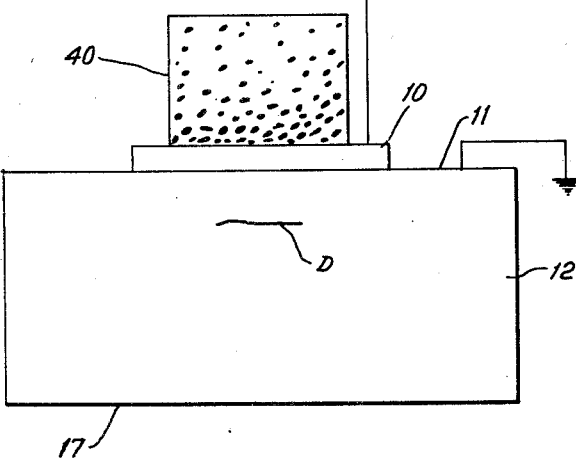
FIG. 2
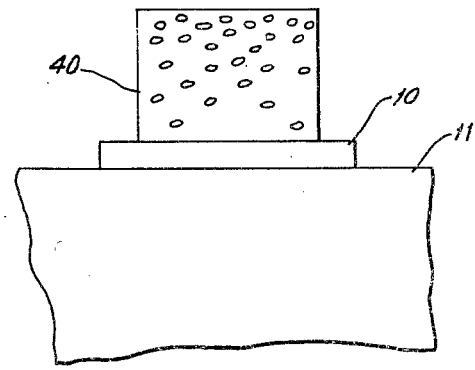
INVENTORS.
FRED H. HARDIE
ROBERT C. GOODMAN
BY
ATTORNEY.

United States Patent Office 2,707,755
Patented May 3, 1955

2,707,755

HIGH ABSORPTION BACKINGS FOR ULTRASONIC CRYSTALS

Fred H. Hardie, Danbury, and Robert C. Goodman, Bridgeport, Conn., assignors to Sperry Products, Inc., Danbury, Conn., a corporation of New York Application July 20, 1950, Serial No. 174,816

4 Claims. (Cl. 310—8.2)

This invention relates to ultrasonic crystals used in testing materials, especially by the pulse technique in which it is desirable that the pulses which are transmitted into the material be highly damped in order to provide a sharp cut-off. Unless such cut-off is provided, reflections of the pulse may start returning to the crystal before the transmission of the pulse has ended. This would interfere with the detection of defects and other reflecting surfaces lying close to the entering surface of the object under test.

In order to increase damping of the crystal beyond the degree of damping provided by the work-load, it has been proposed to load the back surface of the crystal with suitable damping material. Maximum damping is provided when the acoustic impedance of the damping material matches the acoustic impedance of the crystal, in which case the maximum energy is transferred from the rear face of the crystal into the damping material. However, much of the energy radiated into the damping material is reflected back to the crystal, thus nullifying the damping effect of the backing material. The ideal case is that in which the damping material would transmit the maximum amount of energy from the crystal and at the same time absorb the energy to prevent its return to the crystal.

It is therefore the principal object of this invention to provide a backing for a crystal, said backing being designed to allow a maximum amount of energy to be transferred therein from the rear face of the crystal, and at the same time to absorb the energy in the backing so that it will not return to the crystal.

Further objects and advantages of this invention will become apparent in the following detailed description thereof.

In the acccompanying drawings,

Fig. 1 is a front elevation, partly sectioned vertically, of one embodiment of this invention applied to a crystal in contact with a work-piece.

Fig. 2 is a view similar to Fig. 1 of another form of this invention.

Referring to Fig. 1, there is disclosed a piezo-electric element in the form of a quartz crystal 10 one face of which is in engagement with a surface 11 of an object 12 which is to be inspected. Electric pulses may be periodically applied to the crystal by a pulse generator 15 which may be energized from a synchronizer 16 energized from a suitable periodic source such as 60 cycle A. C. The crystal converts the electric oscillations into mechanical vibrations which are transmitted into the object. The pulses will be reflected by any reflecting source which it encounters, such as a flaw D or the rear surface 17 of the object, and the reflected pulses are received by the crystal and reconverted into electric oscillations. The electric oscillations of the original pulse, as well as the reflections thereof, are amplified by an amplifier 20 whose output is caused to vary the horizontal sweep of an oscilloscope 25 by placing the amplifier output on the vertical plates 26. The sweep circuit 27 is synchronized with the pulse generator by synchronizer 16. Thus the generated pulse will be shown as an indication 28, its reflection from rear surface 17 will be shown as an indication 29, and any intermediate reflecting surface (such as defect D) will be indicated at 30.

From the above description it will be apparent that if the generated pulse is not sufficiently damped, reflections from a reflecting surface lying near entering surface 11 will be received by the crystal before the generated pulse ends. Damping is thus highly desirable. The work-piece 12 in contact with the front face of the crystal provides a certain amount of damping, but this is not sufficient. As explained in the introduction hereto, additional damping is required on the rear face of the crystal, and the requirements are: (1) that the damping material will substantially match the impedance of the crystal adjacent the crystal surface to permit maximum energy to be transmitted away from the crystal, and (2) that the energy thus received from the crystal shall be absorbed before it can be returned to energize the crystal again.

To accomplish the above results, there is provided a backing material 40 in engagement with the rear surface of the crystal, but instead of being of uniform acoustic impedance throughout its volume, it is so formed that its acoustic impedance varies continuously rearwardly from the face which engages the crystal. Thus, adjacent the crystal, the impedance of backing 40 substantially matches the impedance of the crystal to permit maximum energy transfer from the crystal into the backing material; but the impedance of the backing material decreases continuously rearwardly from the crystal so as to absorb the energy and prevent its return to the crystal with consequent reenergization thereof. In the form shown in Fig. 1, this result is accomplished by varying the concentration of metal particles, such as aluminum discs, in a plastic matrix, such as polystyrene, with the greatest concentration of metal discs adjacent the crystal surface and a gradually diminishing concentration of metal discs rearwardly from the crystal.

In another form of the invention disclosed in Fig. 2, a phenolic compound such as phenol formaldehyde resin is used. The compound is a liquid cement to which an accelerator is added to cause it to solidify. During this process air bubbles are included by stirring, and, during hardening, the bubbles rise toward the top. There will thus be relatively few bubbles at the bottom, and the number of bubbles will increase steadily toward the top. The amount of accelerator, degree of stirring and control of temperature will determine the distribution of the bubbles. Since the acoustic impedance varies inversely as the number of bubbles, there will be a gradually decreasing impedance toward the top (rearward of the crystal) to cause good transmission of energy into the backing adjacent the crystal and absorption of energy as the distance from the crystal increases. The action is thus the same as in the Fig. 1 form.

Having described our invention, what we claim and desire to secure by Letters Patent is:

1. Means for damping the vibrations of a piezo-electric crystal, comprising a backing member in engagement with a vibrating surface of the crystal, said member having a continuously varying composition to yield varying acoustic impedance from the surface of the crystal outwardly, the acoustic impedance of the composition diminishing as the distance from the crystal increases.

2. Means for damping the vibrations of a piezo-electric crystal, comprising a backing member in engagement with a vibrating surface of the crystal, said member having a continuously varying composition to yield varying acoustic impedance from the surface of the crystal outwardly, the acoustic impedance of the composition diminishing as the distance from the crystal increases, said member comprising a plastic matrix in which a plurality of metal elements are suspended, the concentration of metal elements being greatest adjacent the crystal surface and diminishing outwardly away from the crystal surface.

3. Means for damping the vibrations of a piezo-electric crystal, comprising a backing member in engagement with a vibrating surface of the crystal, said member having a continuously varying composition to yield varying acoustic impedance from the surface of the crystal outwardly, the acoustic impedance of the composition diminishing as the distance from the crystal increases, said member comprising a plastic matrix in which gas bubbles are formed, the concentration of bubbles being least adjacent the crystal surface and increasing outwardly away from the crystal surface.

4. Means for damping the vibrations of a piezo-electric crystal, comprising a backing member in engagement with a vibrating surface of the crystal, said member having a continuously varying composition to yield varying acoustic impedance from the surface of the crystal outwardly, the acoustic impedance of the composition diminishing as the distance from the crystal increases, said member comprising a liquid resin to which an accelerator has been added to cause solidification with the formation of bubbles which rise to the top, whereby the concentration of bubbles will be at least adjacent the crystal surface and will increase outwardly away from the crystal surface.

References Cited in the file of this patent

UNITED STATES PATENTS

| | | |
|---|---|---|
| 1,197,956 | Sabine | Sept. 12, 1916 |
| 1,358,830 | Comerma | Nov. 16, 1920 |
| 1,503,605 | Shaw | Aug. 5, 1924 |
| 2,402,531 | Christian | June 25, 1946 |
| 2,416,337 | Mason | Feb. 25, 1947 |
| 2,421,026 | Hall | May 27, 1947 |
| 2,427,348 | Bond | Sept. 16, 1947 |
| 2,460,153 | Smoluchowski | Jan. 25, 1949 |
| 2,480,535 | Alois | Aug. 30, 1949 |
| 2,496,060 | Meli | Jan. 31, 1950 |
| 2,565,159 | Williams | Aug. 21, 1951 |
| 2,624,852 | Forbes et al. | Jan. 6, 1953 |